(12) United States Patent
Tomforde et al.

(10) Patent No.: US 10,605,177 B2
(45) Date of Patent: Mar. 31, 2020

(54) METHOD FOR PREDICTING A PHASE POSITION OF A CAMSHAFT

(71) Applicant: Volkswagen Aktiengesellschaft, Wolfsburg (DE)

(72) Inventors: Michael Tomforde, Gifhorn (DE); Stephan Schwieger, Wienhausen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 89 days.

(21) Appl. No.: 15/893,619

(22) Filed: Feb. 10, 2018

(65) Prior Publication Data

US 2018/0163645 A1    Jun. 14, 2018

Related U.S. Application Data

(63) Continuation of application No. PCT/EP2016/066899, filed on Jul. 15, 2016.

(30) Foreign Application Priority Data

Aug. 19, 2015    (DE) .......................... 10 2015 215 813

(51) Int. Cl.
*F01L 1/34* (2006.01)
*F02D 13/02* (2006.01)
(Continued)

(52) U.S. Cl.
CPC ..... *F02D 13/0219* (2013.01); *F02D 41/0002* (2013.01); *F02D 41/009* (2013.01);
(Continued)

(58) Field of Classification Search
CPC ............... F02D 41/009; F02D 41/0002; F02D 41/1402; F02D 13/0219; F02D 2041/001;
(Continued)

(56) References Cited

U.S. PATENT DOCUMENTS 6,363,316 B1    3/2002  Soliman et al.
6,488,008 B1   12/2002  Jankovic et al.
(Continued)

FOREIGN PATENT DOCUMENTS

CN    101503971 A    8/2009
CN    103195531 A    7/2013
(Continued)

OTHER PUBLICATIONS

Steinbrecher, Christian: Ein Beitrag zur prädiktiven Regelung verbrennungsmotorischer Prozesse [A Contribution to the Predictive Control of Internal Combustion Engine Processes], p. 15, table 2.1, pp. 56-62; Dissertation, University of Rostock, Germany, 2010.
(Continued)

*Primary Examiner* — Zelalem Eshete
(74) *Attorney, Agent, or Firm* — Manfred Beck, P.A.

(57) ABSTRACT

A method for predicting a future camshaft position includes approximating a regulating circuit or a part of a regulating circuit that includes at least an adjusting device by a transfer function, and ascertaining a future camshaft position on the basis of the transfer function. An engine control unit is also provided.

7 Claims, 3 Drawing Sheets

(51) Int. Cl.
*F02D 41/00* (2006.01)
*F02D 41/14* (2006.01)
*F01L 1/344* (2006.01)

(52) U.S. Cl.
CPC .......... *F02D 41/1402* (2013.01); *F01L 1/344* (2013.01); *F01L 2800/00* (2013.01); *F01L 2800/14* (2013.01); *F01L 2820/02* (2013.01); *F02D 2041/001* (2013.01); *F02D 2041/1412* (2013.01); *F02D 2041/1422* (2013.01); *F02D 2041/1432* (2013.01); *Y02T 10/18* (2013.01); *Y02T 10/42* (2013.01)

(58) Field of Classification Search
CPC ..... F02D 2041/1412; F02D 2041/1422; F02D 2041/1432; F01L 2800/00; F01L 2800/14; F01L 1/344; F01L 2820/02; Y02T 10/42; Y02T 10/18
See application file for complete search history.

(56) References Cited

U.S. PATENT DOCUMENTS

| | | |
|---|---|---|
| 2003/0079701 A1 | 5/2003 | Riedle et al. |
| 2005/0103298 A1 | 5/2005 | Schafer et al. |
| 2009/0198437 A1 | 8/2009 | Mladenovic et al. |
| 2014/0034000 A1 | 2/2014 | Baumann et al. |
| 2015/0144104 A1 | 5/2015 | Elsner et al. |

FOREIGN PATENT DOCUMENTS

| | | | |
|---|---|---|---|
| DE | 199 46 077 A1 | 4/2001 | |
| DE | 102 50 255 A1 | 6/2003 | |
| DE | 102 51 347 A1 | 3/2004 | |
| DE | 10 2009 007 071 A1 | 2/2010 | |
| DE | 10 2012 213 539 A1 | 2/2014 | |
| DE | 10 2013 113 157 A1 | 5/2015 | |
| GB | 2 382 660 A | 6/2003 | |
| GB | 2469208 A * | 10/2010 | .............. B41F 13/02 |

OTHER PUBLICATIONS

Search Report including Provisional Assessment of Patentability issued by the German Patent and Trademark Office for German Patent Application No. DE 10 2015 215 813.6, dated Dec. 9, 2015.
International Search Report for International Application No. PCT/EP2016/066899 and translation thereof, dated Sep. 15, 2016.
International Preliminary Report on Patentability for International Application No. PCT/EP2016/066899 including Written Opinion of the International Searching Authority and translation thereof, dated Feb. 20, 2018.
Search Report dated May 22, 2019, issued by the State Intellectual Property Office of People's Republic of China for Chinese Patent Application No. CN 201680044009.X which is related to U.S. Appl. No. 15/893,619.

* cited by examiner

METHOD FOR PREDICTING A PHASE POSITION OF A CAMSHAFT

CROSS-REFERENCE TO RELATED APPLICATIONS

This application is a continuation, under 35 U.S.C. § 120, of copending International Application No. PCT/EP2016/066899, filed Jul. 15, 2016, which designated the United States; this application also claims the priority, under 35 U.S.C. § 119, of German Patent Application No. DE 10 2015 215 813.6, filed Aug. 19, 2015; the prior applications are herewith incorporated by reference in their entirety.

BACKGROUND OF THE INVENTION

Field of the Invention

The invention relates to a method, an engine configuration, and an engine control unit for predicting the phase position of a camshaft.

In the case of camshaft drives without adjustment, the camshaft is driven by the crankshaft at half the rotational speed via a fixed linkage such as, for instance, a toothed belt, a chain or gearwheels. However, a fixed coupling of the camshaft to the crankshaft results in an inefficient cylinder charge—that is, a non-optimal proportion of fresh air in the combustion chamber. In the case of spark-ignition engines, therefore, the proportion of fresh air in the combustion chamber is captured with the aid of a charge-capture function in the engine control unit. This proportion of fresh air in the combustion chamber is crucially influenced by the opening-time and closing-time of the charge-cycle valve. In order to obtain a cylinder charge that is as efficient as possible within all rotational-speed ranges, the inlet-valve timings and outlet-valve timings are changed by means of a camshaft adjustment as a function of rotational speed and throttle-valve position. For the purpose of camshaft adjustment, an adjusting unit, for instance a hydraulic phase-adjuster operated by engine-oil pressure, is employed, which is also designated as a swivel-motor phase-adjuster and is usually placed at the ends of the camshaft in the power transmission.

The calculation of the charge-capture function takes place at a defined crankshaft angle which lies temporally ahead of the opening and closing of the charge-cycle valve. In the period between calculation and opening or closing of the valve, the camshaft continues to be adjusted relative to the crankshaft by the adjusting unit. Opening angles and closing angles result from this that are really different from those which were used in the calculation of the charge capture. These difference angles between calculation and actual opening angles and closing angles of the valve can lead to an error in the charge calculation.

For the purpose of minimizing the charge error, the position of the camshaft at the times of opening and closing would have to be known at the time of calculation of the charge-capture function. Consequently, a prediction of the future camshaft position is required.

German Patent Application Publication DE 10 2012 213 539 A1 discloses a method for determining a phase position of an adjustable camshaft of an internal-combustion engine which includes a transducer wheel and a camshaft-adjuster. The phase position of the camshaft is determined on the basis of phase-flank interrupts triggered by the transducer wheel and on the basis of a model that is dependent on at least one operating parameter of the camshaft-adjuster. The method enables an accurate determination of a phase position of an adjustable camshaft but does not offer an optimization of the calculation of the charge-capture function.

SUMMARY OF THE INVENTION

It is accordingly an object of the invention to provide a method for predicting a future camshaft position and an engine control unit configured to predict a future camshaft position which at least partially overcome the above-mentioned disadvantages of the heretofore-known methods and engine control units of this general type and which provide a new approach for predicting the camshaft position.

With the foregoing and other objects in view there is provided, in accordance with the invention, a method for predicting a future camshaft position, the method including:
approximating a regulating circuit or a part of a regulating circuit that includes at least an adjusting device by a transfer function; and
ascertaining a future camshaft position based on the transfer function.

In other words, according to the invention there is provided a method for predicting a future camshaft position ($y_{pred}$), in which a regulating circuit or a part of a regulating circuit that includes at least an adjusting device (9) is approximated by a transfer function (G), and a future camshaft position ($y_{pred}$) is ascertained on the basis of the transfer function (G).

The regulating circuit may be, for instance, a closed regulating circuit (closed loop system). In a preferred embodiment, the regulating circuit is a closed regulating circuit formed of a camshaft-position regulator and an adjusting device. But, as an alternative to a closed regulating circuit, merely a part of the regulating circuit, for example precisely the positioning device (phase positioning, phase adjustment), may also be approximated.

In contrast to a linear extrapolation with constant speed of adjustment, a modeling of the regulating circuit or of a part of the regulating circuit as a transfer system has the advantage that there is no phase shift arising out of the determination of the speed of adjustment.

Since in the case of the method according to the invention the activation of the camshaft-adjusting unit is taken into consideration, in particular a high overall accuracy of the prediction arises.

According to a mode of the invention, the transfer function is a PT1 transfer element.

Thus, according to an embodiment of the invention described in more detail below, the transfer function is a PT1 transfer element (first order low-pass). The mapping or representation of the regulating circuit as a PT1 transfer element is particularly low in noise and provides good results. Furthermore, the mapping of the regulating circuit as a PT1 transfer element has a low implementation outlay.

According to another mode of the invention, the step of ascertaining the future camshaft position includes ascertaining the future camshaft position $y_{pred}$ as a predicted camshaft position $y_{pred}$ in accordance with the following equation:

$$y_{pred} = A^n y + \sum_{i=0}^{n-1} A^i B u_{set}$$

where $y_{pred}$ denotes the predicted camshaft position, $u_{set}$ denotes a set value (setpoint value) for a camshaft position, y denotes a camshaft position measured on a last flank, A and B are constants of a time-discrete state-space model of the PT1 transfer element, and n specifies a number of prediction steps.

According to another mode of the invention, the number r of prediction steps preferentially amounts to n=5.

The number n of prediction steps can be chosen arbitrarily. In a preferred embodiment, the number n of prediction steps amounts to n=5. With such a number of prediction steps, a sufficiently accurate result can be achieved with slight computing requirements.

According to another mode of the invention, the transfer function is a PT2 transfer element (second order lag element).

According to a further mode of the invention, the transfer function is an IT1 transfer element (integral element with first order lag).

Thus, a PT2 transfer element or an IT1 transfer element may also come into operation as alternative transfer functions.

According to another mode of the invention, the step of ascertaining the future camshaft position includes ascertaining a predicted camshaft position at a time of opening and/or closing a charge-cycle valve.

The method may therefore, in particular, be used in order to ascertain a predicted future camshaft position at the time of opening and/or closing of the charge-cycle valve.

According to another mode of the invention, the step of ascertaining the future camshaft position includes ascertaining a predicted camshaft position $y_{pred}$ at a time of opening and/or closing a charge-cycle valve, wherein the predicted camshaft position $y_{pred}$ at the time of opening and/or closing the charge-cycle valve is used in a charge-capture function in order to optimize a proportion of fresh air in a combustion chamber of a motor vehicle.

An ascertained predicted camshaft position at the time of the opening or, respectively, the closing of the valve can thus advantageously be used in a charge-capture function for the purpose of optimizing the proportion of fresh air in the combustion chamber of a motor vehicle. A correction of the deviations from the real charge may, amongst other things, result in an improved calculation of the fuel mass and hence in a diminution of the pollutant emissions. This correction may furthermore have a positive effect on the driving characteristics.

Another mode of the invention includes determining a filter-time of the transfer function by using a characteristic map.

Thus, a filter-time of the transfer function can be determined with a characteristic map (characteristic diagram). Alternatively, a filter-time can also be calculated.

The invention further relates to a computer program that is configured to execute the method described herein. The computer program may, for instance, have been implemented in an engine control unit, in order to execute the method described herein. The invention further relates to a non-transient computer-readable medium including instructions for causing a control unit to perform steps in accordance with the method for predicting a future camshaft position as described herein.

With the objects of the invention in view there is also provided, an engine configuration, including:

a regulating circuit or a part of a regulating circuit that includes at least an adjusting device;

an engine control unit including a camshaft prediction unit, the camshaft prediction unit being configured to approximate the regulating circuit or the part of the regulating circuit by a transfer function; and the camshaft prediction unit ascertaining a future camshaft position based on the transfer function.

With the objects of the invention in view there is further provided, an engine control unit, including:

a camshaft prediction unit configured to approximate a regulating circuit or a part of a regulating circuit that includes at least an adjusting device by a transfer function; and the camshaft prediction unit ascertaining a future camshaft position based on the transfer function.

Although the invention is illustrated and described herein as embodied in a method for predicting a phase position of a camshaft and an engine configuration having an engine control unit for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the case of a method according to the invention for predicting a future camshaft position, a regulating circuit including a camshaft-position regulator and an adjusting device is approximated by a transfer function, and a future camshaft position is ascertained on the basis of the transfer function.

Figure 1:
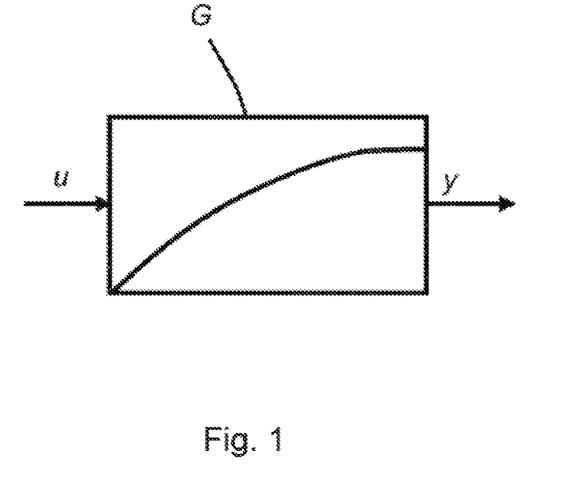
FIG. 1 is a schematic illustration of an exemplary embodiment of a transfer function in accordance with the invention.

An exemplary embodiment of a transfer function is shown in FIG. 1. The transfer function G approximates the behavior of a system. The transfer function G has an input variable u and an output variable y. The transfer function G models the behavior of the system—that is, how the output variable y of the system reacts to alterations of the input variable u of the system.

In the exemplary embodiments described in the following, the transfer function describes, in particular, the regulating circuit formed of the camshaft-position regulator and the adjusting device of a motor vehicle.

As described in the introduction; the proportion of fresh air in the combustion chamber is crucially influenced by the times (points in time) of opening and closing of the gas-exchange valve activated by the camshaft. These times may be interpreted in equivalent manner as angular positions of the crankshaft. These angles are changed by the camshaft adjustment. A camshaft regulation system optimizes the proportion of fresh air in the combustion chamber of a motor vehicle by ascertainment of an optimized charge and by appropriate regulation of the times of opening and closing of the gas-exchange valve activated by the camshaft.

In the exemplary embodiment of the invention now being described, the closed regulating circuit made up of the camshaft-position regulator and the adjusting device is approximated as a PT1 transfer element (first-order low-pass) which is based on a time-discrete state-space model of the form:

$$x(k+1)=Ax(k)+Bu(k)$$

$$y(k)=Cx(k)+Du(k)$$

where x(k) is a system state, y(k) is the regulated variable, here the camshaft position at time-step k, and u(k) is the correcting variable, here accordingly the set value for the camshaft position at time-step k.

For a PT1 transfer element, a state-space representation can be chosen in which C=1 and D=0, so that the state-space model simplifies into:

$$x(k+1)=y(k+1)=Ax(k)+Bu(k)$$

Hence, for the PT1 example, the system state x corresponds to the regulated variable y—that is, here the actual position of the camshaft.

On the basis of this time-discrete state-space model, the future camshaft position $y_{pred}$ of the PT1 transfer element can be ascertained in n prediction steps on the basis of the equation:

$$y(k+n) = A^n y(k) + \sum_{i=0}^{n-1} A^i Bu(k+n-1-i)$$

Assuming a constant set value $u(k)=u_{set}$ for the camshaft position over the prediction period, this simplifies into:

$$y(k+n) = A^n y(k) + \sum_{i=0}^{n-1} A^i Bu_{set}$$

where y(k+n) denotes the predicted camshaft position after n prediction steps, and y(k) is the camshaft position measured on the last flank.

The constants A and B of the time-discrete state-space model of the PT1 transfer element are determined in this embodiment as follows:

$$A = 1 - \frac{h}{T_1}$$

$$B = \frac{h}{T_1}$$

$$h = \frac{60}{n_{eng}} \cdot \frac{w_{pred}}{360} \cdot \frac{1}{n}$$

Here, $w_{pred}$ denotes the angular distance between the last measured flank of the camshaft transducer wheel and the points "valve opens" or, respectively, "valve closes". $T_1$ denotes the time constant of the PT1 transfer element, and $n_{eng}$ is the engine speed—that is, the rotational speed of the crankshaft as made available by the engine management system (engine control system)—n is a predefined integer that specifies the number of prediction steps and h may be interpreted as a prediction-step duration.

Since the angles for the opening and closing of the gas-exchange valve have been defined with the aid of the cam contour of the camshaft, an equivalent prediction-time can be ascertained on the basis of the crank angle distance between the flank and the opening-angle with the aid of the engine speed $n_{eng}$, and the PT1 behavior can be extrapolated for this period.

The filter-time, for instance the above time constant $T_1$ of the PT1 transfer element, may depend on the signal for activation of the camshaft-adjusting unit—that is to say, on the pulse duty ratio with which the output stage of the regulating valve of the corresponding camshaft-adjusting unit is activated, and also on variables influencing the behavior of the process, such as oil temperature or oil pressure. The filter-time can, for instance, be ascertained through the use of a characteristic map on the basis of the process variables made available by the engine management system. Alternatively, the time constant $T_1$ can also be ascertained through the use of equations from the process variables made available.

The following table shows an example of how, for exemplary 3000 rpm and retard adjustment, a time constant $T_1$ can be derived from a given oil temperature:

| Oil Temperature | Time Constant $T_1$ |
| --- | --- |
| −15° C. | 0.02677 |
| 30° C. | 0.02616 |
| 60° C. | 0.02497 |
| 105° C. | 0.01702 |
| 130° C. | 0.01628 |

As can be gathered from the table, the time constant $T_1$ here is chosen in such a way that it decreases with the oil temperature. This is due to the fact that at low temperatures the oil is still relatively viscous and therefore the speed of adjustment is low. Corresponding values for varied influencing factors can also be saved in a characteristic map.

Hence the future camshaft position can be ascertained in, for instance, five prediction steps on the basis of the equation:

$$y_{pred} = A^5 y + \sum_{i=0}^{4} A^i Bu_{set}$$

where $y_{pred}$ denotes the predicted camshaft position after five prediction steps, and y is the camshaft position measured on the last flank.

Depending upon whether the angular distance between the last measured flank of the camshaft transducer wheel and the points "valve opens" or "valve closes" is employed for $w_{pred}$, the predicted camshaft positions for "inlet valve opens" or, respectively, "inlet valve closes" can be ascertained through the use of the above function. Equally, a prediction for the future position of the camshaft transducer wheel for "outlet valve closes" can also be determined.

The predicted camshaft positions ascertained in such a way can be made available to a charge-capture function which can thereby better ascertain the time of opening or closing of the gas-exchange valve activated by the camshaft.

Figure 2:
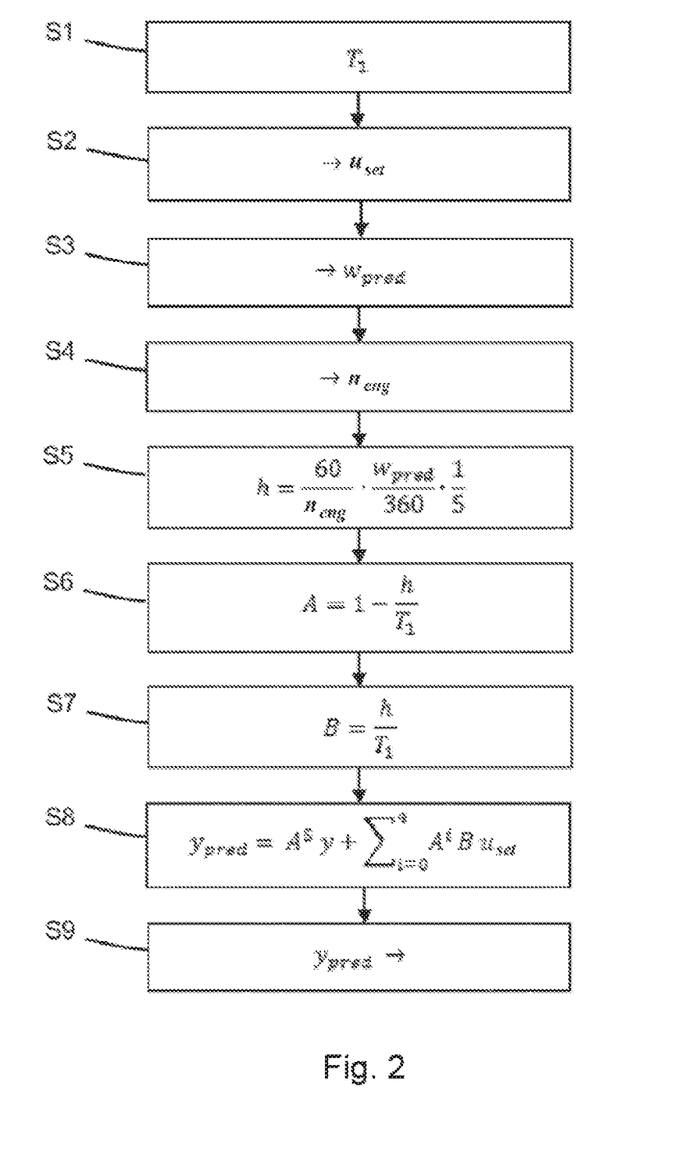
FIG. 2 is a schematic illustration of an exemplary embodiment of a method for predicting a future camshaft position in accordance with the invention.

FIG. 2 shows schematically an exemplary embodiment of a method for predicting a future camshaft position. In a step S1, a time constant $T_1$ of the transfer function is determined, for instance by evaluation of a characteristic map and of corresponding process variables that are made available by the engine control unit. In step S2, a set value $u_{set}$ for the camshaft position is retrieved from the camshaft regulation system. In step S3, the angular distance $w_{pred}$ between the last measured flank of the camshaft transducer wheel and the point "valve opens" is ascertained. In step S4, the current engine speed $n_{eng}$ is retrieved from the engine management system. In step S5, the constant h is calculated on the basis of the engine speed $n_{eng}$ and the angular distance $w_{pred}$. In steps S6 and S7, two parameters A and B of the transfer function are calculated on the basis of the prediction-step duration h and the time constant $T_1$. In step S8, a predicted future camshaft position $y_{pred}$ is calculated from the current camshaft position y on the basis of the calculated parameters A and B and on the basis of the set value $u_{set}$ for the camshaft position. In step S9, this predicted future camshaft position $y_{pred}$ is made available to a charge-capture function.

Figure 3:
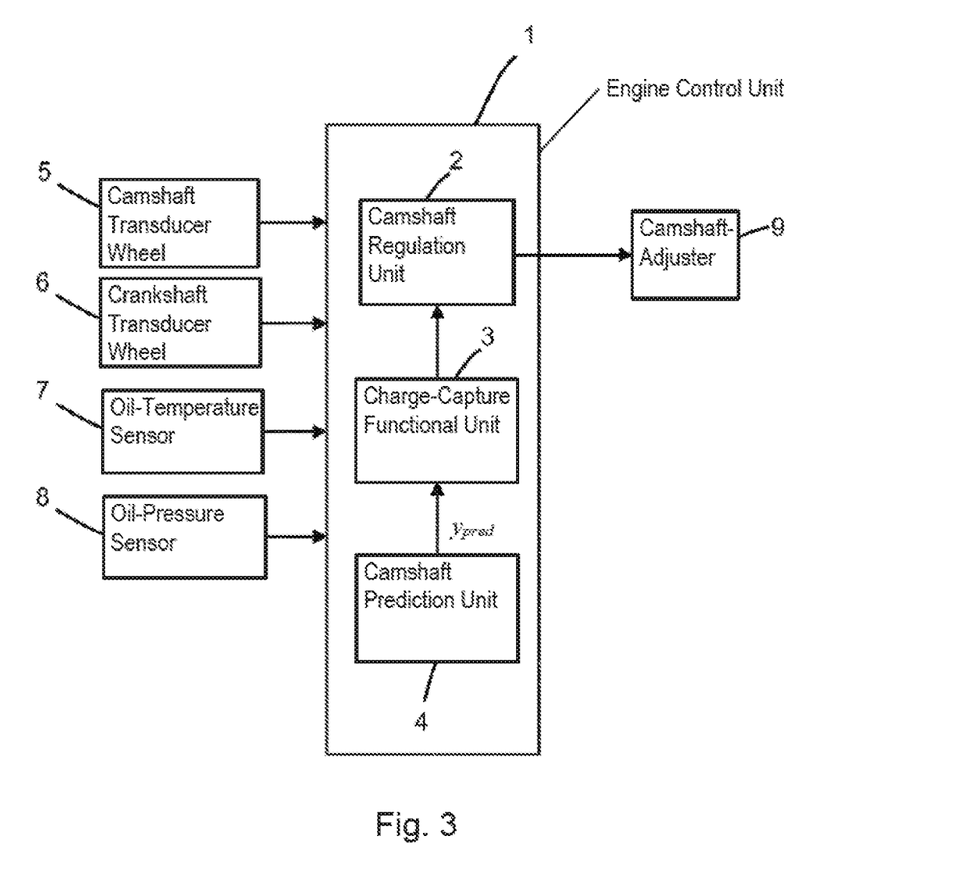
FIG. 3 is a schematic view of an exemplary embodiment of an engine control unit for predicting a future camshaft position in accordance with the invention.

FIG. 3 shows schematically an exemplary embodiment of an engine control unit for predicting a future camshaft position. An engine control unit 1 includes a camshaft regulation unit 2, a charge-capture functional unit 3 and a camshaft prediction unit 4. The camshaft prediction unit 4 ascertains a predicted future camshaft position $y_{pred}$ in accordance with the method described above, and makes the position available to the charge-capture functional unit 3. The camshaft regulation unit 2 regulates a camshaft position on the basis of the output of the charge-capture functional unit 3, and outputs corresponding control signals to a camshaft-adjuster 9. A camshaft transducer wheel 5 with an appropriate sensor makes measuring signals available to the engine control unit that permit inferences as to the current position of the camshaft. A crankshaft transducer wheel 6 with an appropriate sensor makes measuring signals available to the engine control unit 1 that permit inferences as to the current position of the crankshaft. The engine control unit 1 can, for instance, ascertain the current engine speed $n_{eng}$ on the basis of these signals. Further components, such as an oil-temperature sensor 7 and an oil-pressure sensor 8, make variables available to the engine control unit that influence the behavior of the process, such as, for instance, oil temperature or oil pressure. On the basis of these variables, the camshaft prediction unit 4 can, for instance, ascertain a time constant of the transfer function.

In the above exemplary embodiment, a closed regulating circuit made up of a camshaft-position regulator and an adjusting device was approximated by a PT1 transfer function. On the basis of the teaching described above, however, alternative embodiments of the teaching of the invention are possible.

For instance, instead of a PT1 transfer function, other transfer functions—such as, for example, PT2 or others— could also come into operation. In such cases, a person skilled in the art will adapt the state-space model to the transfer function being used. For instance, it is known to a person skilled in the art that in the case of more complex transfer functions C is generally represented as a matrix. In the case of PT1, this output matrix C, which maps the states of the transfer element onto the output, as described above, is reduced to a scalar. In the case of SISO systems (single input, single output), the output matrix C is reduced to a vector.

Furthermore, instead of a complete regulating circuit merely a part of a regulating circuit may also be approximated by the transfer function in alternative embodiments. For instance, in particular the positioning device (phase positioning, phase adjustment) can be approximated through the use of an I-element that exhibits an integrative transfer behavior. The prediction proceeds similarly in the case of the approximation of the positioning device (phase positioning, phase adjustment) through the use of an I-element, as in the case of the PT1 embodiment described above. The speed of adjustment is stored in a characteristic map as a function of various engine parameters such as rotational speed or oil pressure, oil temperature and pulse duty ratio for the phase-positioner. Instead of the 5-step prediction described above, in one embodiment only one prediction step is carried out—that is to say, n=1. The input u in this case corresponds not to the set camshaft value (camshaft setpoint value) but rather to the PWM (Pulse-Width Modulation) pulse duty ratio for the phase-positioner, which is output from the camshaft-position regulator.

LIST OF REFERENCE CHARACTERS 1 engine control unit
2 camshaft regulation unit
3 charge-capture functional unit
4 camshaft prediction unit
5 camshaft transducer wheel
6 crankshaft transducer wheel
7 oil-temperature sensor
8 oil-pressure sensor
9 camshaft-adjuster
S1 determination of the time constant $T_1$
S2 determination of the set value $u_{set}$ for the camshaft position
S3 determination of the angular distance $w_{pred}$
S4 retrieval of the engine speed $n_{end}$
S5 calculation of the constant h of the PT1 transfer element
S6 calculation of parameter A of the PT1 transfer element
S7 calculation of parameter B of the PT1 transfer element
S8 calculation of the predicted future camshaft position $y_{pred}$
S9 output of the predicted future camshaft position $y_{pred}$
G transfer function
$n_{eng}$ engine speed
$w_{pred}$ angular distance
x state of the transfer function
y output value of the transfer function (current camshaft position)
$y_{pred}$ predicted camshaft position
A, B parameters of the transfer function
C, D further parameters of the transfer function
h prediction-step duration
$T_1$ time constant
$u_{set}$ set value for the camshaft position

What is claimed is:
1. A method for predicting a future camshaft position, the method comprising:
  approximating one of a regulating circuit and a part of a regulating circuit that includes at least an adjusting device by a transfer function, wherein the transfer function is a PT1 transfer element; and
  ascertaining a future camshaft position based on the transfer function, wherein the step of ascertaining the future camshaft position includes ascertaining the future camshaft position as a predicted camshaft position in accordance with the following equation:

$$y_{pred} = A^n y + \sum_{i=0}^{n-1} A^i B u_{set}$$

where $y_{pred}$ denotes the predicted camshaft position, $u_{set}$ denotes a set value for a camshaft position, y denotes a camshaft position measured on a last flank, A and B are constants of a time-discrete state-space model of the PT1 transfer element, and n specifies a number of prediction steps.

2. The method according to claim 1, wherein the number n of prediction steps preferentially amounts to n=5.

3. The method according to claim 1, wherein the step of ascertaining the future camshaft position includes ascertaining a predicted camshaft position at a time of one of opening and closing a charge-cycle valve.

4. The method according to claim 1, wherein the step of ascertaining the future camshaft position includes ascertaining a predicted camshaft position at a time of one of opening and closing a charge-cycle valve, and wherein the predicted camshaft position at the time of one of opening and closing the charge-cycle valve is used in a charge-capture function in order to optimize a proportion of fresh air in a combustion chamber of a motor vehicle.

5. The method according to claim 1, which comprises determining a filter-time of the transfer function by using a characteristic map.

6. An engine configuration, comprising:
one of a regulating circuit and a part of a regulating circuit that includes at least an adjusting device;
an engine control unit including a camshaft prediction unit, said camshaft prediction unit being configured to approximate said one of said regulating circuit and said part of said regulating circuit by a transfer function, wherein the transfer function is a PT1 transfer element; and
said camshaft prediction unit ascertaining a future camshaft position based on said transfer function, wherein ascertaining the future camshaft position includes ascertaining the future camshaft position as a predicted camshaft position in accordance with the following equation:

$$y_{pred} = A^n y + \sum_{i=0}^{n-1} A^i B u_{set}$$

where $y_{pred}$ denotes the predicted camshaft position, u denotes a set value for a camshaft position, y denotes a camshaft position measured on a last flank, A and B are constants of a time-discrete state-space model of the PT1 transfer element, and n specifies a number of prediction steps.

7. An engine control unit, comprising:
a camshaft prediction unit configured to approximate one of a regulating circuit and a part of a regulating circuit that includes at least an adjusting device by a transfer function, wherein the transfer function is a PT1 transfer element; and
said camshaft prediction unit ascertaining a future camshaft position based on said transfer function, wherein ascertaining the future camshaft position includes ascertaining the future camshaft position as a predicted camshaft position in accordance with the following equation:

$$y_{pred} = A^n y + \sum_{i=0}^{n-1} A^i B u_{set}$$

where $y_{pred}$ denotes the predicted camshaft position, u denotes a set value for a camshaft position, y denotes a camshaft position measured on a last flank, A and B are constants of a time-discrete state-space model of the PT1 transfer element, and n specifies a number of prediction steps.

* * * * *

UNITED STATES PATENT AND TRADEMARK OFFICE
CERTIFICATE OF CORRECTION

PATENT NO. : 10,605,177 B2
APPLICATION NO. : 15/893619
DATED : March 31, 2020
INVENTOR(S) : Michael Tomforde and Stephan Schwieger It is certified that error appears in the above-identified patent and that said Letters Patent is hereby corrected as shown below:

In the Specification

Column 5, Line 7: "$k(k + 1) = A\ x(k) + B\ u(k)$" should read: --$x(k + 1) = A\ x(k) + B\ u(k)$--

Column 8, Line 8: "$n - 1$" should read: --$n = 1$--

In the Claims

Column 10, Line 6: "$u$" should read: --$u_{set}$--

Column 10, Line 31: "$u$" should read: --$u_{set}$--

Signed and Sealed this
Nineteenth Day of May, 2020

Andrei Iancu
*Director of the United States Patent and Trademark Office*